Feb. 21, 1928.
W. TURNER
1,659,674
ROTARY PLOW
Original Filed April 11, 1921    3 Sheets-Sheet 3
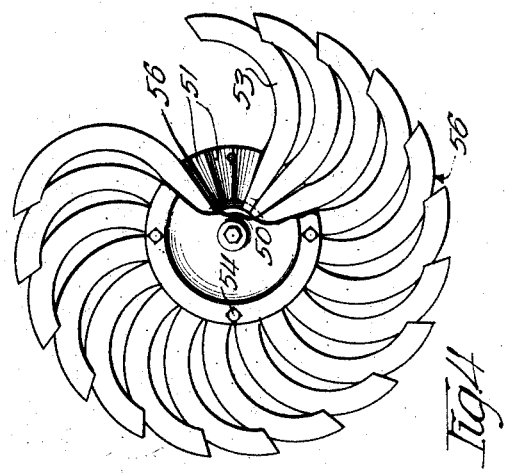
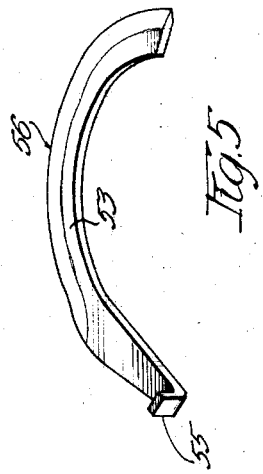
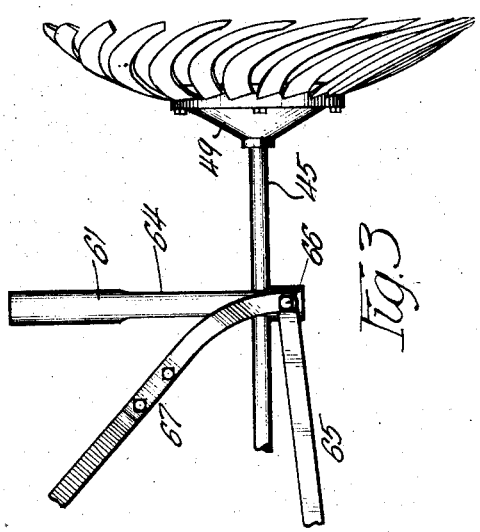
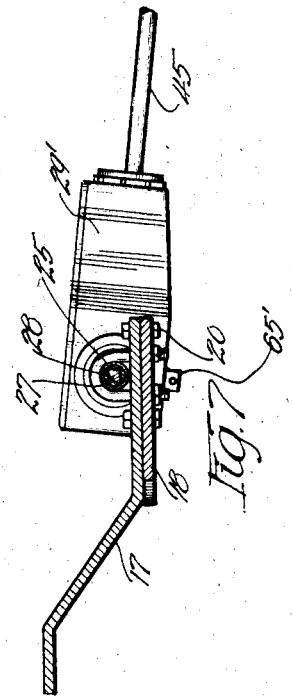
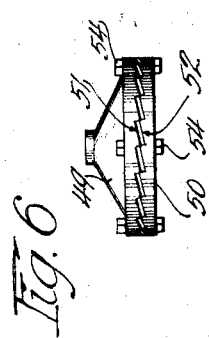
Inventor:
William Turner Patented Feb. 21, 1928.

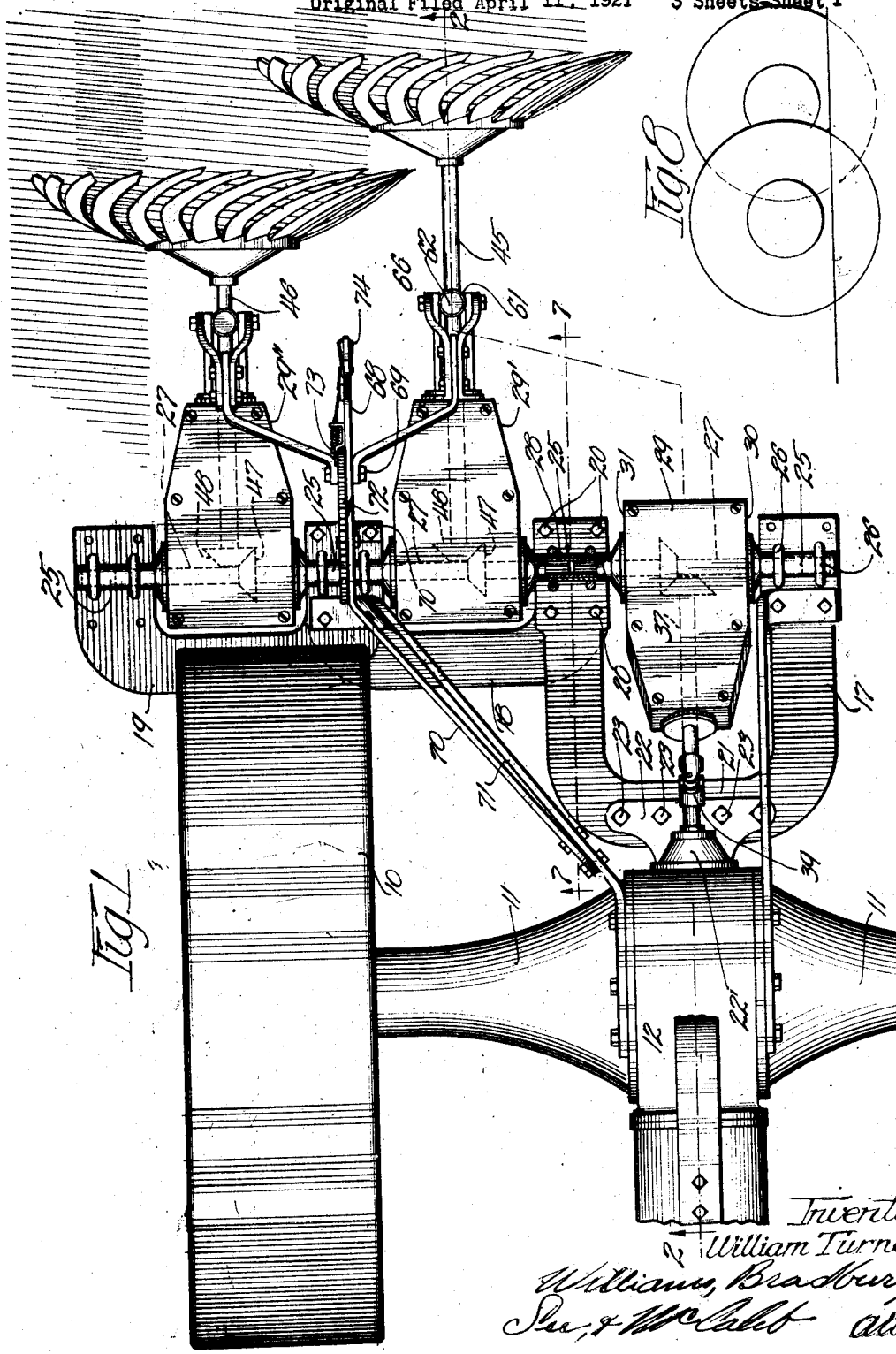

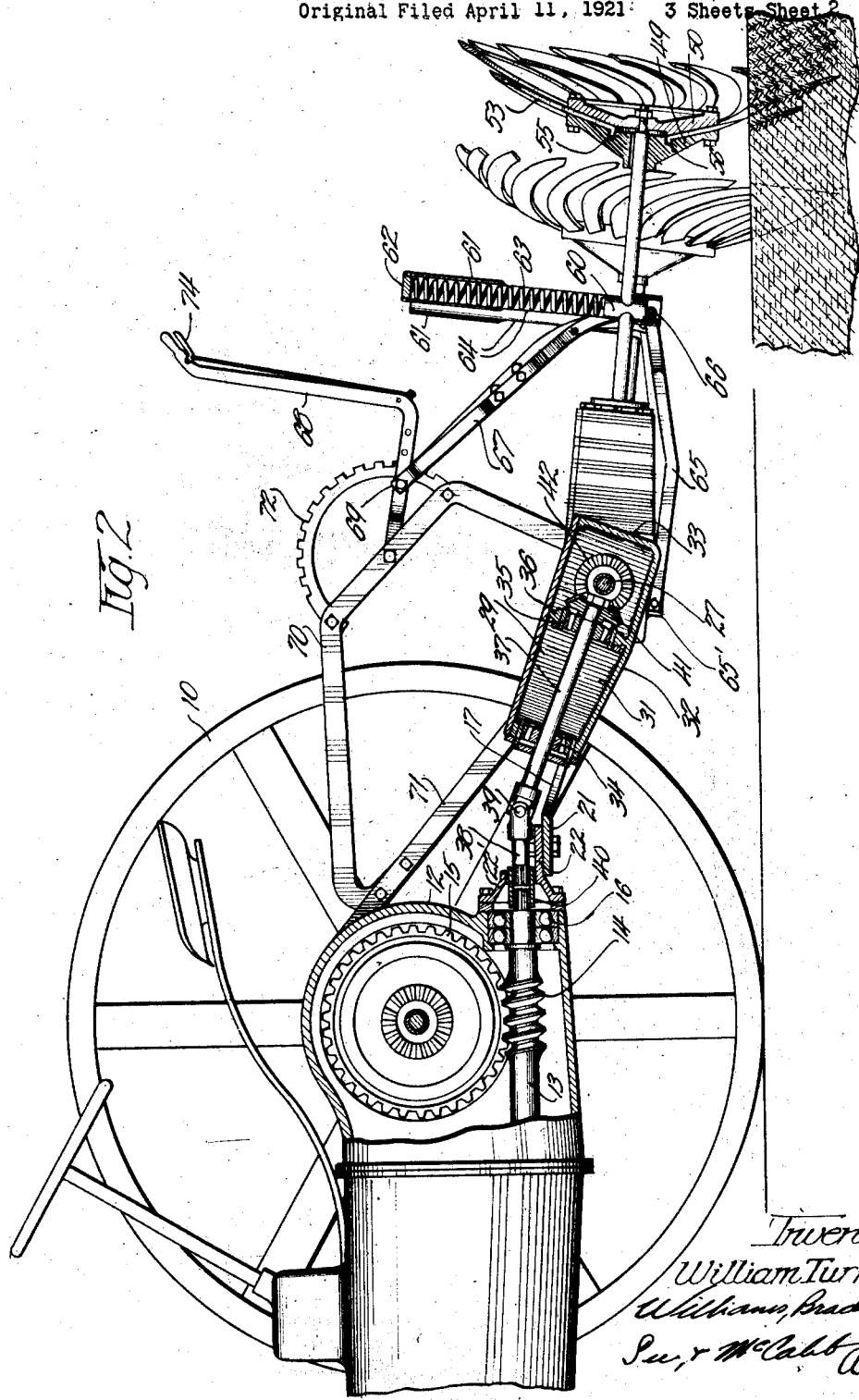

1,659,674

UNITED STATES PATENT OFFICE.

WILLIAM TURNER, OF CHICAGO, ILLINOIS, ASSIGNOR TO TURNER ROTARY PLOWS, OF CHICAGO, ILLINOIS, A COMMON-LAW TRUST.

ROTARY PLOW.

Application filed April 11, 1921, Serial No. 460,235. Renewed May 29, 1925.

My invention relates to improvements in rotary plows and is particularly concerned with improvements in that type of rotary plow which comprises a rotary earth working element mounted upon an axis which extends substantially parallel with the direction of travel of the vehicle to which the rotary earth working element is secured.

In my copending application, Serial No. 412,713, I have described and claimed a rotary plow of the type referred to above, and my present invention relates to improvements upon the construction shown in my aforesaid application, the objects of my invention being:

First; to provide a plow of the type referred to, the construction of which is so modified as to make it possible to operate the earth working elements in gangs;

Second; to provide a plow of the character described in which the parts are so arranged as to simplify the apparatus for controlling the operation thereof;

Third; to provide a gang plow of the character described which is simple in construction and economical to manufacture, and which can be readily attached to tractors of standard design;

Fourth; to provide a plow element comprising a rotary earth working element, said plow element being of such design as to permit the assembling of a plurality of such plow elements side by side to form a gang plow having as many earth working elements as may be desired;

Fifth; to provide a plow comprising a rotary element having a plurality of blades or cutting elements, the cutting edges of which are convex and arranged so as to give the earth working element lead; and Sixth; to provide an earth working element of the character described in which the cutting elements are formed from flat spring metal stock.

Other objects will appear as this description progresses, reference being had to the accompanying drawings in which Figure 1 is a top plan view of a portion of a tractor showing my improved plow attached thereto.

Fig. 2 is a vertical longitudinal section taken substantially on line 2—2 of Figure 1.

Fig. 3 is a side elevation of my improved earth working element and portions of the control.

Fig. 4 is an end elevation of my improved earth working element, portions thereof being broken away.

Fig. 5 is a perspective view of one of the cutting elements of my improved earth working element.

Fig. 6 is a side elevation of the hub member forming a part of the earth working element.

Fig. 7 is a longitudinal sectional detail taken on line 7—7 of Figure 1; and

Fig. 8 is a diagrammatic view illustrating the overlap of the earth working elements.

Throughout the several views similar reference characters will be used in referring to similar parts.

In Figs. 1 and 2 I have conventionally illustrated a tractor comprising a traction wheel 10, axle housings 11, the inner ends of which are flared outwardly and bolted to the sides of the differential housing 12. I have illustrated the tractor as comprising a propeller shaft 13 having a worm 14 at the rear end thereof which co-acts with the worm wheel 15 forming a part of the driving element of the differential. The extreme rear end of the propeller shaft is journaled in a suitable bearing 16 carried by the differential housing. The construction thus far described is purely conventional and forms no part of my present invention except as the parts described co-act with the remaining elements of my invention about to be described.

The frame member of my improved plow comprises a plurality of U-shaped frames 17, 18 and 19, the adjacent legs of which are detachably secured together by means of bolts 20 or any other suitable means. The legs of the U-shaped frame 17 are longer than the legs of the remaining frames and the cross member 21 of the frame 17 is secured to the draw-bar 22 which forms an extension on the annular cap 22', which is secured to the differential housing in alinement with the propeller shaft 13. Bolts 23 secure the cross member 21 to the drawbar 22.

A plurality of bearings 25 are secured to the upper sides of the ends of the U-shaped frames 17, 18 and 19, by means of U-clamps and each frame carries a shaft section 27, the ends of which project approximately half-way into the ends of the adjacent bearings 25, adjacent ends of the shaft sections being secured together in driving relation by suitable couplings 28 in such manner that the shaft sections 27 form a single unitary shaft. The shaft section supported by the ends of the frame 17 carries a housing 29 comprising the sides 30 and 31, the bottom 32, and the end 33. A bearing 34 is mounted in the forward end of the housing and a second bearing 35 is supported intermediate the ends of the housing by the annular web 36, the bearing 35 being in alinement with the bearing 34. A shaft 37 is mounted in the bearings 34 and 35, the forward end of the shaft 37 being connected with the shaft section 38 by the universal joint 39. The forward end of the shaft section 38 is connected by means of a suitable coupling 40 with the rear end of the propeller shaft 13 so as to establish a driving connection between the propeller shaft 13 and the shaft 37. A bevel gear 41 secured to the rear end of the shaft 37 meshes with a similar bevel gear 42 carried by the shaft section 27 which is supported by the frame 17.

Housings 29' and 29'' are pivotally mounted on the shaft sections 27 respectively carried by the frames 18 and 19. The housings 29' and 29'' are similar in all respects to the housing 29. Shafts 45 and 46 are rotatably mounted in the housing 29 and 29' respectively, and driven from the corresponding shafts 27 through bevel gears 47 and 48.

Secured to the free ends of the shafts 45 and 46 are earth working elements, details of construction of which are shown in Figs. 2, 3, 4, 5 and 6. These earth working elements each comprise a hub member formed in two parts 49 and 50, the first of which is keyed or otherwise rigidly secured to its driving shaft. The opposing faces of the members 49 and 50 are provided with radially extending seats 51 and 52 between which the inner ends of the cutting elements 53 are rigidly clamped by means of the bolts 54. As shown in Fig. 2, the inner ends of the cutting elements 53 are provided with angularly extending legs 55 which are received in an annular groove 56. The cutting elements 53 are flat but longitudinally curved to provide a cutting edge 56 which is sharpened as shown in Fig. 5. In order to give each of the cutting elements "lead", so that in one revolution of the earth working element it can advance a distance substantially equal to the lead of a cutting element multiplied by the number of cutting elements, I tilt the seats 51 and 52 longitudinaly as shown in Fig. 2 and transversely as shown in Fig. 6, thereby producing an earth working element in which the sharpened edges of the cutting elements all lie in a common convex surface, as shown in Figs. 1, 2 and 3. The driving relation between the tractor and earth working elements should be such that for any period the travel of the tractor should be equal to the lead of the earth working elements multiplied by the number of revolutions which they make during that period of time. With such construction the cutting elements of the earth working elements travel through the earth without imposing a drag upon the tractor and without tending to push the tractor ahead, so that substantially no bending stresses are imposed upon the flat sides of the earth cutting elements.

For controlling the depth of the furrow and for permitting the earth working elements to automatically adjust themselves to avoid stones and other similar obstacles which may be encountered, I mount a bearing block 60 on each of the shafts 45, 46 which is slidably mounted in a tubular member 61, the upper end of which is provided with a closure 62 which acts as an abutment for a compression spring 63 which is located between the closure 62 and the upper end of the bearing block 60. Each of the tubular members 61 is provided with a slot 64 through which the corresponding shaft bearing the earth working element projects. The tubular members 61 are supported by the radius links 65, the forward ends of which are pivoted upon lugs 65' upon the housings 29', 29'', and the rear ends of which are pivotally secured to the lower ends of the tubular member 61 as shown at 66, and by means of links 67, the lower ends of which are pivoted to the tubular members 61 by the pivot pins 66, and the upper ends of which are pivotally secured to a common adjusting lever 68 by means of the pivot pin 69.

The adjusting lever 68 is mounted upon a bracket 70, the forward end of which is secured to the brace rod 71 which extends from the differential housing to the frame member 19, and the lower end of which rests upon the same portion of the frame member 19 to which the lower end of the brace rod 17 is secured. A segment 72 and a latch 73 which is operable by the handle 74 provide means for locking the tubular member 61 in any desired position.

With the construction just described, by urging downwardly upon the links 67, the earth working elements can be adjusted to plow furrows of any desired depth. If the earth working elements encounter stones and other similar obstructions, they merely ride upwardly over the same until the obstructions are passed, when due to the tension of the springs 63 they will again be forced into the earth.

To insure proper working of the soil lying between two adjacent earth working elements, it is necessary to stagger these elements in relation to each other as shown in Figs. 1, 2 and 8, which means that alternate shafts, such, for instance, as the shaft 46, will be shorter than the remaining shafts.

Since all of the earth working elements, or, at least, a plurality of them, are to be controlled by a single controlling lever, this means that to insure all the earth working elements plowing furrows of the same depth, it is necessary to compensate for the difference in lengths of the shafts. I prefer to do this by moving the tubular element 61 on the short shaft forwardly and slightly closer to the pivot point of the shaft 46.

While I have described the details of construction of the preferred embodiment of my invention, it is to be clearly understood that my invention is not limited to these details but is capable of other modifications and adaptations within the scope of my claims.

Having thus described my invention, what I claim is:—

1. A rotary plow comprising a vehicle having a longitudinally extending propeller shaft, a supporting frame carried by said vehicle, a second shaft extending transversely of said vehicle and journaled on said supporting frame, a housing journaled on said shaft, a third shaft journaled in said housing and projecting at an angle to said second shaft, means in said housing for driving said third shaft from said second shaft, a rotary earth working member mounted on the free end of said third shaft, a spring abutment mounted for pivotal movement about an axis near that of said second shaft, a spring interposed between said third shaft and said spring abutment, and means for adjusting the vertical position of said abutment.

2. A rotary plow comprising a vehicle having a propeller shaft, a supporting frame carried by said vehicle, a second shaft extending transversely of said vehicle and journaled on said supporting frame, a housing journaled on said shaft, a third shaft journaled in said housing and projecting at an angle to said second shaft, means in said housing for driving said third shaft from said second shaft, a rotary earth working member mounted on the free end of said third shaft, a spring abutment, a spring interposed between said third shaft and said spring abutment, and means for adjusting the vertical position of said abutment.

3. A rotary plow comprising a vehicle, a supporting frame carried by said vehicle, a second shaft extending transversely of said vehicle and journaled on said supporting frame, a third shaft mounted to oscillate about said second shaft as an axis, means for driving said third shaft from said second shaft, a rotary earth working member mounted on the free end of said third shaft, a spring abutment, a spring interposed between said third shaft and said spring abutment, and means for adjusting the vertical position of said abutment.

4. A rotary plow comprising a frame, a shaft journaled on said frame, means for driving one end of said shaft, a housing journaled on said shaft, a second shaft journaled in said housing for oscillating about said first shaft as an axis, driving connections in said housing for driving said second shaft from said first named shaft, a pivotally mounted spring abutment, and a spring between said abutment and said second shaft.

5. A rotary plow comprising a frame, a shaft journaled on said frame, means for driving one end of said shaft, a housing journaled on said shaft, a second shaft journaled in said housing for oscillating about said first shaft as an axis, driving connections in said housing for driving said second shaft from said first named shaft, a spring abutment, and a spring between said abutment and said second shaft.

6. Earth working equipment comprising the combination with a motor vehicle having a rear axle and a longitudinal propeller shaft, of a transverse shaft behind said rear axle, a transmission means extending from said propeller shaft back to said transverse shaft, laterally offset shafts extending rearwardly from said transverse shaft, earth working elements on said last mentioned shafts, and connections for driving said last mentioned shafts from said transverse shaft, said connections permitting pivotal adjustment of said earth working elements about the axis of said transverse shaft.

In witness whereof, I hereunto subscribe my name this 9th day of April, 1921.

WILLIAM TURNER.